(No Model.)

T. W. DUFFY.
EXPANSION JOINT FOR STEAM AND OTHER PIPES.

No. 311,178. Patented Jan. 27, 1885.

Witnesses:
A. H. Gartner
H. A. Johnstone

Inventor:
T. W. Duffy
by his attorney
Thomas D. Stetson

UNITED STATES PATENT OFFICE.

THOMAS WILLIAM DUFFY, OF NEW YORK, N. Y., ASSIGNOR TO THE NEW YORK STEAM COMPANY, OF NEW YORK.

EXPANSION-JOINT FOR STEAM AND OTHER PIPES.

SPECIFICATION forming part of Letters Patent No. 311,178, dated January 27, 1885.

Application filed March 2, 1883. (No model.)

*To all whom it may concern:*

Be it known that I, THOMAS WILLIAM DUFFY, late of Liverpool, Lancashire, England, now residing in New York city, in the county and State of New York, have invented certain new and useful Improvements in Expansion-Joints for Steam-Pipes and other Pipes, of which the following is a specification.

I have devised improved means for providing rigid and reliable flanges at the ends of a short length of thin tubing, which tubing is corrugated circularly, either in a continuous helical corrugation or in the form of rings. In what I esteem the most complete form of the invention the stout flanges are extended within the tube a little distance, and not only support the corrugated tube, but also support an internal cylindrical tube, which is loosely mounted, with liberty to slide in its connections with the flanged metal at one end or both ends, and forms a smooth, uniform surface for the flow of steam or other fluid through the expansion-joint. The corrugations in the main portion of the thin pipe expand and contract, while the flanged ends are rigid and absolutely unyielding.

Parts of the invention may be used without the whole. I propose to form the flanged end on a corrugated tube by simply thickening, or by welding, brazing, or otherwise attaching a piece of rigid metal, or by employing thick material for the ends of the corrugated tube, so that these ends, being simply spread and brought to the proper position, serve as rigid flanges, while the body of the tube is so thin and so much corrugated as to yield to the forces impressed and serve as an expansion-joint. I can make the flanges by soldering or brazing a thin tube directly to a thick ring, serving as the flange. I can use hard or soft solder in connecting a corrugated thin tube with a flange having an internal extension, as just described.

The accompanying drawings form a part of this specification, and represent what I consider the best means of carrying out the invention.

All the figures are central longitudinal sections. Each shows one of the flanged ends. It will be understood that in each the opposite end has a corresponding flange and accompanying parts.

Figure 1:
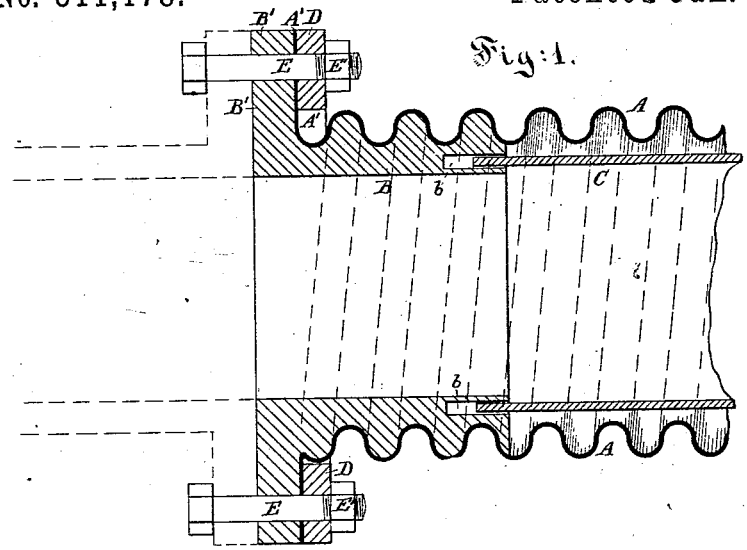
Figure 2:
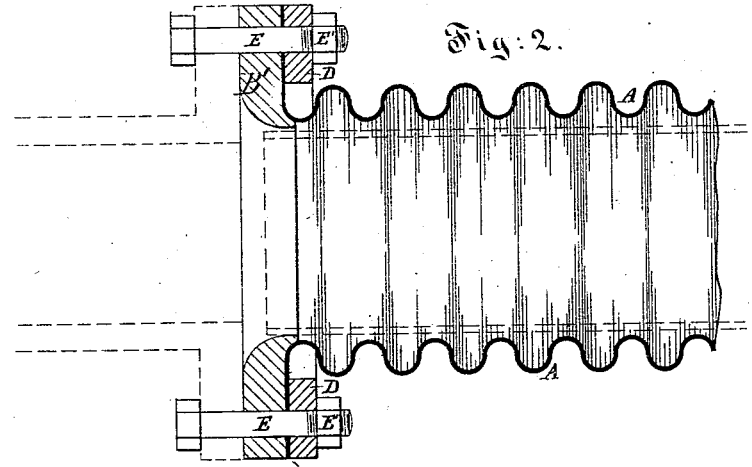
Figure 3:
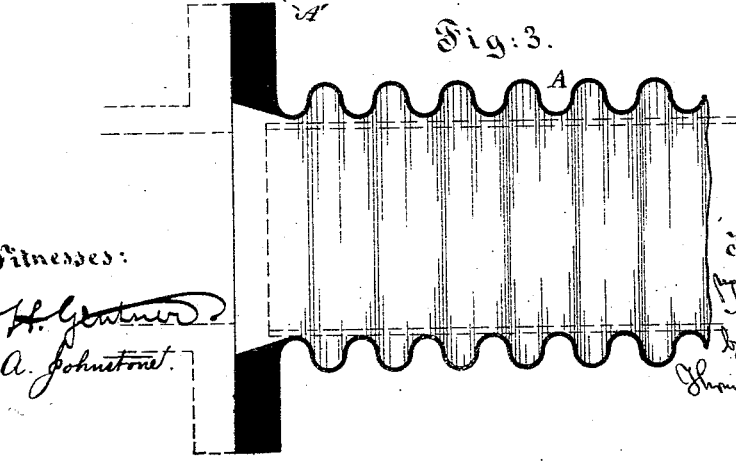

Figure 1 shows what I esteem the most complete form of the invention. Figs. 2 and 3 represent modifications containing portions of the invention.

Similar letters of reference indicate corresponding parts in all the figures where they occur.

I have in an allowed application filed December 4, 1882, Serial No. 78,367, shown a thin tube corrugated helically or screwwise, strongly set within rigid flanges of cast-iron or other suitable material, which are provided entirely exterior thereto. Such construction is not sought to be covered in this application. My present invention is intended to overcome some of the difficulties connected therewith.

In a patent issued to Charles E. Emery, dated February 21, 1882, No. 253,917, there is set forth, in connection with one or more extended diaphragms of annular form, a plane cylindrical tube allowed to slide as the expansion and contraction of the joint shall require. That internal tube performed the important function of leading currents of steam or other fluid through the expansion-joint without allowing it to impinge against the re-entering angles and roughnesses offered by the interior of the chamber. My present improvement is another method of applying a corresponding loosely-fitted internal tube within my circumferentially-corrugated tube. I allow both ends of the internal tube to be mounted loosely, so that it can play.

Referring to Fig. 1, A is a tube of copper or other suitable material corrugated in a continuous spiral or screw-thread, with each extreme end turned outward and duly spread, as at A'. B' is a stout flange of iron, having cast or otherwise formed in one therewith a lip, short tube, or thimble, B, spirally threaded on its exterior, corresponding to the spiral corrugations of A. The interior of A is tinned at and near the ends. The exterior of the threaded thimble B and the adjacent surface of the flange B' is tinned. The parts A A' B B' are screwed together by giving the proper rotatory motion to one relatively to the other, and the whole is then subjected to heat sufficient to melt the tin and "sweat"

the surfaces together. Additional tin or solder may be applied to entirely fill the slight space between the parts. This may be conveniently attained by immersing the entire end of the tube A A' and properly-placed thimble and flange B B' in a kettle of melted solder. On properly wiping the compound joint and allowing the parts to cool a perfect union will be attained. C is a plain cylindrical or ordinary tube of iron, copper, or other suitable material. It is fitted in a deep end groove, b, formed in the thimble B, with freedom to move deeper into and to be drawn partially out of said groove, as required by the endwise expansion and contraction of the several parts. D is a ring or follower adapted to press firmly against the outer face of the flange A'. E is a bolt, of which there may be any number required, inserted through the flange B' at proper distances apart, and through the flange of an adjacent length of ordinary cast-iron pipe or other rigid pipe, to which this device may be required to be attached. E' are nuts fitted thereon. When the device is put in use, the nuts E' are turned to press the follower D tightly against the flange.

Referring to Fig. 2, there appears the thin pipe A A', corrugated and flanged as before; but in this form the corrugations need not be spiral or screwwise. They may be plain rings. In other words, the pipe A may be alternately of larger and smaller diameter, taking care to form the circular grooves and ridges with a properly-curved outline, so that the expansion and contraction shall be distributed and not concentrated at any particular lines, so as to induce fracture. In this figure, B' is a stout flange of cast-iron. D is a follower held by bolts E and nuts E', as in the other form. In this form the adjacent surfaces of A' and B' should be tinned and applied together with heat and additional solder, so as to form a tight and reliable joint; but it is important that the tinning shall not extend too far inward, for reasons which will presently appear. The surface of B' should be carefully fitted to that of A', especially at the inner edge.

Referring to Fig. 3, there appears the same circularly-corrugated part, A, corrugated either helically or in plain rings; but instead of the compound flange in the preceding figures there is here only a single flange, represented as a thick portion of the same metal, A. The pipe may be so constructed, using material which is of sufficient thickness at the ends, and carefully manipulating to preserve the thickness at those portions, while the main body of the tube alone is made thin, thickened only in the immediate vicinity of the flange. I believe that either of the modes of construction here shown may be adopted with some success; but I prefer the construction shown in Fig. 1, for the reason, among others, that it supports the internal smooth tube, C, and offers less resistance by eddies and friction to the flow of fluid through the joint. Packing may be introduced under the followers D in any case when desired. It is not absolutely necessary that the parts A A' and B B' shall be sweated or otherwise soldered. The pressure induced by the follower D may be relied on to form a sufficiently tight joint, packing being introduced between the flanges A' and B' when desired.

Further modifications may be made in the forms and proportions.

I believe that good copper, originally of proper thickness and frequently annealed during the treatment, may be thrown into much deeper corrugations than here shown. I propose to corrugate as deeply as is found practicable.

The capacity of the device for a large amount of expansion and contraction obviously depends much on the depth of the corrugations; but care must be taken not to draw the metal at any point so as to make it too thin. There must be a liberal margin of safety to resist the pressure of steam or other fluid to which it is ever to be subjected.

I can counterbore the thimble B instead of producing the end groove, b.

It will be understood without illustration that if the thin wall of metal between the deep groove b and the inner surface of the thimble B is removed the tube C will remain in very nearly its present position, and that it will be restrained from too great end motion by abutting loosely against the end of the counterbored portion, which will correspond in position with the bottom of the groove b.

The dotted lines in Figs. 2 and 3 show an analogous mode of mounting the internal plain tube, C, in combination with the corrugated tube. The pipe C is thus indicated as lying loosely inclosed within the corrugated tube, abutting against the adjacent ends of rigid pipes of sufficiently smaller internal diameter. (Shown in dotted lines.) The internal tube, C, is made sufficiently short to allow the necessary amount of end-play.

The internal diameter of the ring or follower D may be, as shown, a little greater than the greatest diameter of the corrugated tube A. So proportioned, it may be slipped back and forward freely on the tube A. It is of course necessary, before the flanges A' are formed up at both ends, to apply the two followers D upon the tube A—one for the flange at each end. I propose in some cases to make the internal diameter of the followers D less than here shown, and shape them to match screw-threads on the exterior of A. In such cases they must be slipped on and moved upon the exterior of A by turning them around like nuts.

The flanges A' may be produced by any coppersmith by skillfully hammering outward the metal to form the flange.

The follower D, supported on any suitable cheeks, (not shown,) may constitute the surfaces on which the hammering may be effected.

The operation of screwing the corrugated tubing on the part B will assist in turning the flange outward on the flange B'.

The follower D insures a firm pressure on the flange A', extending continuously around, although the fastening-bolts are only distributed at intervals.

I claim as my invention—

1. The combination of corrugated tube A, having flange A', inserted tube C, and flanged thimble B, having the expansion-groove $b$, all substantially as shown and set forth.

2. The flanged thimble B B', with the exterior of B screw-threaded, in combination with the flanged tube A A', formed in helical corrugations matching to the screw-threads on B, so as to be supported thereby, and suitable means for holding the flanges tightly together, all substantially as and for the purposes herein specified.

In testimony whereof I have hereunto set my hand, at New York city, this 28th day of February, 1883, in presence of two subscribing witnesses.

THOS. WM. DUFFY.

Witnesses:
WM. JAMIESON,
S. G. METCALF.